United States Patent Office 3,368,864
Patented Feb. 13, 1968

3,368,864
COLOR MATCHING PROCESS
Ulrich Gugerli, Reinach, Basel-Land, Switzerland, assignor to Sandoz Ltd. (also known as Sandoz AG), Basel, Switzerland
No Drawing. Filed June 10, 1963, Ser. No. 286,498
Claims priority, application Switzerland, June 12, 1962, 6,995/62; Sept. 20, 1962, 11,099/62
3 Claims. (Cl. 8—25)

ABSTRACT OF THE DISCLOSURE

The color of dyed and pigmented articles is effectively duplicated by, first, preparing a series of colored articles approximating the original article in color. The optical reflective spectra of the articles is measured and the difference between the spectra of the original article and the apparent duplicates noted. A determinant not equal to zero is set up involving the color concentrations and the number of dyeings therewith. The gradient of the color differences at the center of gravity of the concentration range of the coloring agents used is determined and this value is used in a further formula involving the expected rate of change of the color difference with concentration to determine the next set of proportions of different colors to mix. The mixing, dyeing, and calculations are repeated to match colors. A $2^n$-factorial statistical design is used in the arrangement of proportions of colorant and concentrations thereof.

---

This invention relates to a process for the dyeing or pigmentation of substrates to the color of a given pattern.

This is a problem of great technical importance and its solution has long been sought by means of the visual estimation of color differences, a method which remains the common practice today. In this method the point of departure is generally a dyed or pigmented sample which as nearly as possible matches the pattern in color and for which the dyeing or pigmentation recipe, the colorants, and the colorant concentrations are known. By reference to the nature and the magnitude of the visually observed color difference, the changes are estimated which must be made to the recipe in order to obtain the color of the pattern. If this modified recipe is used for the dyeing or pigmentation of the substrate intended for the final match, the visually observed color difference between this first match and the pattern is usually found to be too great for acceptance, and the recipe must be corrected once again. The changes to the colorant concentrations that are necessary to achieve the color of the pattern are again estimated from the nature and the magnitude of the visually observed residual color difference. In many cases the recipe formulated after this second correcting step still does not provide a sufficiently close match and very often several further corrections must be estimated and performed before the desired result is obtained.

It is of great technical and commercial interest to keep the number of correcting steps as small as possible. In the conventional coloristic procedure described above this depends in great measure on the experience of the observer.

In recent years it has been established that the appropriate use of optical measurements for purposes of recipe formulation can lead to a considerable reduction in the number of correcting steps, provided certain prerequisite conditions are fulfilled. Until now this has been particularly the case when the pattern and the match are non-metameric, that is to say, when the problem can be reduced to the exact reproduction of the reflectance spectrum of the pattern. But this is a special case of rather rare occurrence and the conditions for success are that the colorants, the assistants, the dyeing or pigmenting conditions and the substrate must be identical in the case of the pattern and the match.

The reflectance spectrum of the pattern can be approximately if not exactly reproduced with more frequent success. This is still a special case for which efficient methods of selecting suitable colorants and calculating their concentrations are known. Undoubtedly it is of technical interest in many cases to aim at the closest possible coincidence of the reflectance spectra, but for various reasons—among which those connected with the technical process of dyeing or pigmentation are especially significant and will probably remain so in the future—a marked degree of metamerism can scarcely be avoided altogether. On the contrary it is to be expected that distinctly metameric matches will, as before, remain the rule.

In such cases the resources of reflectance spectroscopy for the solution of the matching problem by calculation are no longer adequate and recourse must be made to applications of the known methods of colorimetry. Essentially the task consists in calculating the colorant concentrations so that the colorimetrically defined color difference between pattern and match disappears, and for this purpose it is desirable to rely upon an approximately uniform color system.

This problem has not yet been solved in a way which satisfies all the requirements of industrial dyeing and pigmentation practice. True, the principal physical and mathematical foundations for the construction of the methods are known, as well as certain numerical routes to the goal, but on the other hand the following points must be taken into account, points which have proved to be deficiencies of the hitherto known recipe formulation techniques, especially as regards the general case of the metameric match. These deficiencies are:

(1) The current methods of selecting colorants and determining their concentrations from optical measurements almost invariably necessitate a very large amount of numerical computation which can be done economically only by using an expensive electronic computer, e.g. a program controlled digital computer, or a special analogue computer, or alternatively a numerical or graphical method of approximation. A serious drawback of the last-named methods is the danger of undetectable systematic errors from the unavoidable introduction of simplifications that obscure the true physical situation.

(2) Most of the known methods of instrumental color formulation make use in one form or another of a theoretically founded or empirically derived function expressing the relation between the spectral reflectance and the colorant concentration for a given substrate. To facilitate the numerical computation, in most cases use is made of a function of the reflectance which, within certain limits, is itself to a sufficient degree of approximation linearly dependent upon the colorant concentration. The best known though by no means the only useful form of such a function is that based upon the work of Kubelka and Munk. Experience has shown that such functional transformations are by no means generally applicable but must be adapted to the particular type of match that is required, either by introducing suitable parameters, by limitation to a more or less narrow concentration range, or by other expedients.

(3) Further, in all the hitherto known techniques of objective recipe formulation it is assumed that the above-mentioned functions, in the case of combination dyeings, are yielded by addition of the corresponding functions of the elements, an assumption which is by no means always supported by experience. Experimental verification has shown that these hypotheses of additivity often do not hold good even when the adopted function of the reflectance with dyeings of each isolated element is, with good approximation, linearly dependent upon the concentration of the pertinent colorant.

(4) This last fact is closely connected with the chemical or physical interactions between the colorants that take place in the dyeing process. By this are meant blocking effects, shifts in the equilibria of complexes containing ions of heavy metals, and similar phenomena. Interactions of this kind are well known to the colorant and pigment technologist. The instrumental techniques of color formulation hitherto suggested do not give due weight to these not infrequent effects, and it is not surprising to find that they make the exactitude of the methods problematic.

(5) The above are among the main reasons why objective methods of color formulation fail to achieve their object at the first attempt, except in the very simplest cases, and why there is usually no alternative but to adopt a stepwise procedure similar to that of conventional visual assessment. The actual advantage of numerical colour formulation must therefore be seen to lie in the possibility of increasing the rate of convergence, not in the complete suppression of corrections.

(6) A further factor which can play a considerable part in decreasing the rate of convergence in the known matching methods is the often unsatisfactory reproducibility of the dyeings. Without doubt the most effective way of eliminating variations of this kind is precise standardization and control of the influences which come into play in the dyeing process. Unsatisfactory reproducibility can also be compensated for to some extent by increasing the number of dyeings. The current methods of color formulation depending on optical measurements, however, are not really suitable when a larger number of dyeings is prepared with a view to achieving a higher degree of accuracy at every step of approximation.

For these reasons the method herein disclosed achieves the goal with a lesser number of correcting steps, especially in cases where the initially described conventional coloristic procedure and the hitherto known instrumental matching techniques are known to proceed at a slow rate of convergence.

In the new process as in the coloristic method the point of departure is a dyeing or pigmenting recipe which may be expected to yield a color located in the vicinity of that of the pattern. In dyeing practice it is not usually difficult to find such a recipe. It may also be derived from calculations such as those performed on the basis of measurements of the reflectance spectrum. The number of colorants that must be used to obtain the color of the pattern is denoted $n$ in the following, $n$ being a positive integer which in view of the three-dimensionality of the colour space is preferably three or higher than three.

The successive steps of the process of the invention will now be set forth in detail.

(1) Initially, instead of preparing a single exploratory first match, several dyeings, at least $n+1$, are prepared. The concentrations of the colorants are varied from those of the estimated or calculated starting recipe, though not by too large amounts but preferably between about 5 and 50%. Let $c_{ij}$ represent the concentration of the $j$th colorant in the $i$th dyeing; it is necessary that within the entirety of the prepared dyeings at least $n+1$ dyeings are present which satisfy the condition that the determinant $$D = \begin{vmatrix} 1 & c_{11} & c_{12} & c_{13} & \ldots & c_{1j} & \ldots & c_{1n} \\ 1 & c_{21} & c_{22} & c_{23} & \ldots & c_{2j} & \ldots & c_{2n} \\ 1 & c_{31} & c_{32} & c_{33} & \ldots & c_{3j} & \ldots & c_{3n} \\ \ldots \\ 1 & c_{i1} & c_{i2} & c_{i3} & \ldots & c_{ij} & \ldots & c_{in} \\ \ldots \\ 1 & c_{n1} & c_{n2} & c_{n3} & \ldots & c_{nj} & \ldots & c_{nn} \\ 1 & c_{n+1,1} & c_{n+1,2} & c_{n+1,3} & \ldots & c_{n+1,j} & \ldots & c_{n+1,n} \end{vmatrix} \quad (1)$$

is different from zero. When the selection of the colorant concentrations is based upon known experimental designs, of which a few are displayed below, it ensures that the above condition is observed from the outset. But if the concentrations are varied in an unsystematic manner, then the value of the determinant D should invariably be calculated to check whether or not the above condition is fulfilled.

(2) The pattern and each of the dyeings, or a part but at least $n+1$ dyeings which satisfy the concentration condition defined under 1, are optically measured in the known way and from the measured results the total colour differences are determined:

$$\Delta E_1, \Delta E_2, \Delta E_3, \ldots, \Delta E_i, \ldots, \Delta E_{n+1}$$

It is advisable here to work on the basis of an approximately uniform colour system, e.g. that of Adams and Nickerson, that of MacAdam, or of the colour system defined in DIN 6164, etc. (a) The system of Adams and Nickerson was formulated by D. Nickerson on the basis of work by E. Q. Adams (E. Q. Adams, J. Opt. Soc. Amer. 32, 168, 1942; D. Nickerson, Amer. Dyestuff Rep. 39, 541, 1960). (b) The second uniform approximation was formulated by D. L. MacAdam (J. Opt. Soc. Amer. 32, 247, 1942). (c) The system of Richter (DIN system) is described in Farbe 1, 85, 1953, and in No. 6164 of the Deutsche Industrie-Normen (DIN 6164).

(3) Should these measurements indicate that one of the dyeings already agrees sufficiently well with the pattern, i.e. that its color difference is smaller than the prescribed tolerance, the aim is already achieved. But this will rarely be the case in practice. Therefore, on the basis of the individual color differences $\Delta E_i$ determined for the separate dyeings, the gradient of the color difference in the concentration space at the center of gravity of the concentration range under examination is calculated with approximate accuracy. When precisely $n+1$ color differences are present for evaluation and the components of the gradient are, as usual, defined as follows:

$$\text{grad } \Delta E = \left( \frac{\partial \Delta E}{\partial c_1}, \frac{\partial \Delta E}{\partial c_2}, \ldots, \frac{\partial \Delta E}{\partial c_j}, \ldots, \frac{\partial \Delta E}{\partial c_n} \right)$$

$$= (g_1, g_2, \ldots, g_j, \ldots, g_n) \quad (2)$$

then the $j$th component $g_j$ of the gradient can be calculated with the aid of the following formula $$g_j = \frac{\partial \Delta E}{\partial c_j} = \frac{D_j}{D} \quad (3)$$

where $D_j$ is that determinant which is derived from the above-described determinant D by replacement of the column $\{c_{ji}\}$, in which the concentrations of the $j$th colorant are set forth $$\{c_{ij}\} = \begin{pmatrix} c_{1j} \\ c_{2j} \\ \vdots \\ c_{ij} \\ \vdots \\ c_{n+1,j} \end{pmatrix} \quad (4)$$

by the vector of the determined colour differences $$\{\Delta E_i\} = \begin{pmatrix} \Delta E_1 \\ \Delta E_2 \\ \vdots \\ \Delta E_i \\ \vdots \\ \Delta E_{n+1} \end{pmatrix} \quad (5)$$

in the case of a ternary combination D, for example, is $$D = \begin{vmatrix} 1 & c_{11} & c_{12} & c_{13} \\ 1 & c_{21} & c_{22} & c_{23} \\ 1 & c_{31} & c_{32} & c_{33} \\ 1 & c_{41} & c_{42} & c_{43} \end{vmatrix}$$

where $c_{23}$, for example, represents the concentration of the third colorant in the second dyeing. The determinant $D_2$ required for calculating the second component $g_2$ of the gradient according to $$g_2 = \frac{\partial \Delta E}{\partial c_2} = \frac{D_2}{D}$$

is obtained according to the calculation instructions described above, for example, $$D_2 = \begin{vmatrix} 1 & c_{11} & \Delta E_1 & c_{13} \\ 1 & c_{21} & \Delta E_2 & c_{23} \\ 1 & c_{31} & \Delta E_3 & c_{33} \\ 1 & c_{41} & \Delta E_4 & c_{43} \end{vmatrix}$$

where $\Delta E_3$ represents e.g. the color difference of the third dyeing relative to the pattern.

When more than $n+1$ measured color differences are present, an $n$-dimensional linear regression calculation is performed in the known manner. This in turn yields the $n$ components of the gradient and at the same time it minimizes random variations in the results due to the limited precision of the dyeings and possibly of the measuring instruments.

From the components of the gradient the concentration changes $$\Delta c_1, \Delta c_2, \ldots, \Delta c_j, \ldots, \Delta c_n$$

are calculated according to the following formula:

$$\Delta c_j = -f(\overline{\Delta E}) \cdot g_j \cdot \frac{\overline{\Delta E}}{\sum_{j=1}^{n} g_j^2} \quad (6)$$

where $$\overline{\Delta E} = \frac{1}{m} \sum_{i=1}^{m} \Delta E_i \quad (7)$$

represents the average color difference of the measured $m$ dyeings, where $m \geq n+1$, and where $f(\overline{\Delta E})$ is a constant or a freely chosen function of the average color difference $\Delta E$ which on the basis of experience has been adjusted to a maximum rate of convergence in the present process. If the available knowledge of the rate of convergence of the process for a particular matching problem or problems is not sufficient, then $$f(\overline{\Delta E}) = 1 \quad (8)$$

is established.

Finally for each colorant a corrected concentration $c_j'$ is calculated according to $$c_j' = °c_j + \Delta c_j \quad (9)$$

where $°c_j$ represents any colorant concentration within the previously examined range.

Then at least $n+1$ dyeings are prepared again in the manner defined under 1, except that this time the dyeing recipe is formulated as a variation of the corrected colorant concentrations $c_j'$. The color differences of these dyeings in relation to the pattern are determined as described under 2 above. If one of these differences is smaller than the prescribed color tolerance, the goal is reached. Failing this, steps 3, 1 and 2 are repeated in that order until a dyeing is obtained which is in sufficiently close agreement with the color of the pattern.

The method of approximately calculating the gradient of the color difference in the concentration space that is set forth under 3 above was found to be time-consuming when performed without the aid of an efficient computer. Further, it was found that the amount of numerical calculation can be substantially reduced when the concentrations of the colorants are selected in accordance with a $2^n$-factorial design or with a fractional replication of such a design. The choice of such an experimental design has the additional advantage of ensuring from the start that the determinant $D$ does not become zero.

The factorial design is set up in the following way: For each dyestuff at each successive approximation step two levels of concentration are established. One of these can be freely chosen and in the following is denoted $^1c_j$ for the $j$th colorant. The second concentration level is denoted $^2c_j$ and the difference between them is expressed as:

$$d_j = {}^2c_j - {}^1c_j \quad (10)$$

The difference $d_j$ may be positive or negative.

It has been found convenient to choose $$^1c_j = °c_j - \frac{d_j}{2} \quad (11a)$$

and $$^2c_j = °c_j - \frac{d_j}{2} \quad (11b)$$

where $°c_j$ represents that concentration of the $j$th colorant which is estimated or calculated before the first set of dyeings is prepared, or the concentration $c_j$ which is derived from an approximation step by the calculation according to Formula 9.

When the number of colorants $n$ is three or less than three, it is sufficient to prepare four dyeings. The colorant concentrations $^c i_j$ are then selected with the aid of one of the two following numerical schemes:

| $i$ | $j$ | | |
|---|---|---|---|
| | 1 | 2 | 3 |
| 1 | −1 | −1 | −1 |
| 2 | −1 | 1 | 1 |
| 3 | 1 | −1 | 1 |
| 4 | 1 | 1 | −1 |

(12)

| $i$ | $j$ | | |
|---|---|---|---|
| | 1 | 2 | 3 |
| 1 | 1 | 1 | 1 |
| 2 | 1 | −1 | −1 |
| 3 | −1 | 1 | −1 |
| 4 | −1 | −1 | 1 |

(13)

Schemes of this kind are termed in the following design matrices.

The concentration $c_{ij}$ of the $j$th colorant in the $i$th dyeing is chosen according to $$c_{ij} = {}^1c_j + \frac{d_j}{2}(l + z_{ij}) \quad (14)$$

where $z_{ij}$ represents the figure given in one and the same of the above two design matrices (12) and (13) in the $j$th column and the $i$th row.

The components $g_j$ of the gradient are obtained in a simple way from one and the same of the above two design matrices (12) or (13) with the aid of a formula which can also be used in other cases:

$$g_j = \frac{2}{m \cdot d_j} \sum_{i=1}^{m} z_{ij} \cdot \Delta E_i \quad (15)$$

When the design matrix (12) is used the colorant concentrations are chosen according to the above considerations, for example, in accordance with the following experimental design which is derived from Formula 14:

| $i$ | $j$ | | |
|---|---|---|---|
| | 1 | 2 | 3 |
| 1 | $^1c_1$ | $^1c_2$ | $^1c_3$ |
| 2 | $^1c_1$ | $^1c_2+d_2$ | $^1c_3+d_3$ |
| 3 | $^1c_1+d_1$ | $^1c_2$ | $^1c_3+d_3$ |
| 4 | $^1c_1+d_1$ | $^1c_2+d_2$ | $^1c_3$ |

In this case the components of the gradient are obtained with the aid of formula (15) as follows:

$$g_1 = \frac{1}{2d_1}(-\Delta E_1 - \Delta E_2 + \Delta E_3 + \Delta E_4)$$

$$g_2 = \frac{1}{2d_2}(-\Delta E_1 + \Delta E_2 - \Delta E_3 + \Delta E_4)$$

$$g_3 = \frac{1}{2d_3}(-\Delta E_1 + \Delta E_2 + \Delta E_3 - \Delta E_4)$$

When only $n=2$ colorants are used, the following design matrix is employed which is constructed from one of the two design matrices (12) or (13) by omission of one column:

| $i$ | $j$ | |
|---|---|---|
|  | 1 | 2 |
| 1 | −1 | −1 |
| 2 | −1 | 1 |
| 3 | 1 | −1 |
| 4 | 1 | 1 |

(16)

The selection of the concentrations and the calculation of the components of the gradient are performed in an analogous manner with the aid of Formulae 14 and 15 respectively.

If the number of colorants is greater than three but less than seven or seven itself, then $n=8$ dyeings are prepared. If the inherent variations in the dyeings are relatively great, it is advisable to prepare eight dyeings when less than four colorants are employed. With eight dyeings a number of suitable design matrices can be constructed which correspond to fractional replications of $2^n$-factorial designs. One of these is set out below; it is suitable for a number of colorants $n$ from 2 to 6.

| $i$ | $j$ | | | | | |
|---|---|---|---|---|---|---|
|  | 1 | 2 | 3 | 4 | 5 | 6 |
| 1 | −1 | 1 | −1 | 1 | 1 | −1 |
| 2 | 1 | 1 | −1 | −1 | 1 | 1 |
| 3 | 1 | −1 | 1 | 1 | −1 | 1 |
| 4 | −1 | −1 | −1 | −1 | −1 | −1 |
| 5 | −1 | 1 | 1 | −1 | −1 | 1 |
| 6 | 1 | 1 | 1 | 1 | −1 | −1 |
| 7 | 1 | −1 | 1 | −1 | 1 | −1 |
| 8 | −1 | −1 | 1 | 1 | 1 | 1 |

(17)

The colorant concentrations are selected as before according to Formula 14 and the components of the gradient are calculated with Formula 15. If the number of colorants is less than six, then only $n$, e.g. the first $n$ columns of the above numerical scheme, are employed; it is self-evident that fewer components of the gradient have then to be calculated, namely exactly $n$ components.

From the above it follows that in the case of a combination of four colorants, for example, the concentrations can be selected according to the following experimental design:

| $i$ | $j$ | | | |
|---|---|---|---|---|
|  | 1 | 2 | 3 | 4 |
| 1 | $1_{c1}$ | $1_{c2+d2}$ | $1_{c3}$ | $1_{c4+d4}$ |
| 2 | $1_{c1+d1}$ | $1_{c2+d2}$ | $1_{c3}$ | $1_{c4}$ |
| 3 | $1_{c1+d1}$ | $1_{c2}$ | $1_{c3}$ | $1_{c4+d4}$ |
| 4 | $1_{c1}$ | $1_{c2}$ | $1_{c3}$ | $1_{c4}$ |
| 5 | $1_{c1}$ | $1_{c2+d2}$ | $1_{c3+d3}$ | $1_{c4}$ |
| 6 | $1_{c1+d1}$ | $1_{c2+d2}$ | $1_{c3+d3}$ | $1_{c4+d4}$ |
| 7 | $1_{c1+d1}$ | $1_{c2}$ | $1_{c3+d3}$ | $1_{c4}$ |
| 8 | $1_{c1}$ | $1_{c2}$ | $1_{c3+d3}$ | $1_{c4+d4}$ |

The components $g_j$ of the gradient are obtained in this case according to Formula 19 as follows:

$$g_1 = \frac{1}{4d_1}(-\Delta E_1 + \Delta E_2 + \Delta E_3 - \Delta E_4 - \Delta E_5 + \Delta E_6 + \Delta E_7 - E_8)$$

$$g_2 = \frac{1}{4d_2}(\Delta E_1 + \Delta E_2 - \Delta E_3 - \Delta E_4 + \Delta E_5 + \Delta E_6 - \Delta E_7 - \Delta E_8)$$

$$g_3 = \frac{1}{4d_3}(-\Delta E_1 - \Delta E_2 - \Delta E_3 - \Delta E_4 + \Delta E_5 + \Delta E_6 + \Delta E_7 + \Delta E_8)$$

$$g_4 = \frac{1}{4d_4}(\Delta E_1 - \Delta E_2 + \Delta E_3 - \Delta E_4 - \Delta E_5 + \Delta E_6 - \Delta E_7 + \Delta E_8)$$

In place of the colorant concentrations it has been found that it is advantageous to use their logarithms, since thereby the rate of convergence can be accelerated to some extent. The logarithms of the colorant concentrations are inserted into the formulae displayed above and the calculation is performed as described in the foregoing.

The applicability of the process herein disclosed is not limited to substrates of a particular nature nor to colorants of a given constitution having specific properties. It can be employed to match colors on or in shaped articles of all kinds, e.g. textile filaments and fibers, woven or knitted fabrics, and other textile goods made therefrom, as well as plastic films and sheets. Wool is dyed by the normal methods, e.g. with acid wool dyestuffs or metal complex dyestuffs, cotton with direct, vat or reactive dyestuffs applied from aqueous solution, hydrophobic fibers, e.g. of linear aromatic polyesters, synthetic polyamides or cellulose esters, with water-dispersible dyestuffs free from water-solubilizing groups, and acrylic and modified acrylic fibers with dyestuffs containing a basic group. Besides dyeing proper, the process is also applicable to textile coloration by padding and printing methods and to the pigmentation of plastics that are molded into shaped articles, of solutions of fiber-forming materials that are spun as filaments, and of rubber, resins, and other plastic masses.

In the following examples the percentages are by weight.

EXAMPLE 1

The pattern is a wool yarn dyed to an orange color. It is known that the color can be matched on the identical substrate with two dyestuffs only, C.I. Acid Yellow 17, C.I. No. 18965 (Dyestuff 1) and a mixture of 59% of the monoazo dyestuff 1-amino-4-acetylaminobenzene-2-sulfonic acid →1 - hydroxy - 7-aminonaphthalene-3-sulfonic acid and 41% of the monoazo dyestuff C.L. Acid Red 1, C.I. No. 18050 (Dyestuff 2), to a residual color difference of 0.5 N.B.S. units. The following approximate dyeing recipe is available:

|  | Percent |
|---|---|
| Dyestuff 1 | 0.95 |
| Dyestuff 2 | 0.48 |

These percentages are based on the weight of the substrate to be dyed.

*First correcting step*

(1) The known, approximate dyeing recipe is varied thrice in an unsystematic manner and three dyeings are prepared. The concentrations of the dyestuffs in the varied recipes are as follows:

| Dyeing No. | log $c_1$ ($c_1$ in percent) | log $c_2$ ($c_2$ in percent) | $\Delta E$ (NBS Units) |
|---|---|---|---|
| 1 | −0.060 | −0.353 | 6.20 |
| 2 | +0.020 | −0.325 | 7.40 |
| 3 | −0.030 | −0.289 | 5.40 |
| Average | −0.0233 | −0.3223 | 6.33 |

(2) The dyeings are measured by the spectrophotometric method and from the results obtained the three color differences $\Delta E$ in relation to the pattern are computed with the aid of the Adams and Nickerson formula. The color differences are given in the final column of the above table.

(3) In the course of the subsequent calculation, the logarithms of the dyestuff concentrations are substituted for the concentrations themselves. The determinant D is yielded by Equation 1:

$$D = \begin{vmatrix} 1 & -0.060 & -0.353 \\ 1 & +0.020 & -0.325 \\ 2 & -0.030 & -0.289 \end{vmatrix} = 0.004280$$

D is different from zero, which is a necessary condition for the subsequent steps. By means of (4) and (5) the determinants $D_1$ and $D_2$ are calculated:

$$D_1 = \begin{vmatrix} 1 & 6.2 & -0.353 \\ 1 & 7.4 & -0.289 \\ 1 & 5.4 & -0.289 \end{vmatrix} = 0.0992$$

and $$D_2 = \begin{vmatrix} 1 & -0.060 & 6.2 \\ 1 & +0.020 & 7.4 \\ 1 & -0.030 & 5.4 \end{vmatrix} = 0.1000$$

The components $g_1$ and $g_2$ of the gradient are derived from Formula 3:

$$g_1 = \frac{0.0992}{0.004280} = 23.18$$

and $$g_2 = \frac{0.1000}{0.004280} = -23.36$$

The average color difference $\overline{\Delta E}$ is obtained according to (7):

$$\overline{\Delta E} = 6.33$$

Employing $$\sum_{j=1}^{2} g_j^2 = 1083$$

and on the basis of the choice of $$\log \, ^0c_1 = \overline{\log \, c_1} = -0.0233$$
$$\log \, ^0c_2 = \overline{\log \, c_2} = -0.3223$$

the corrected logarithmic concentration coordinates are calculated with the aid of (6), (8) and (9):

$$\log c_1' = -0.0233 - 23.18 \cdot \frac{6.33}{1083} = -0.1588$$

$$\log c_2' = -0.3223 + 29.36 \cdot \frac{6.33}{1083} = -0.1858$$

After the first approximation step the corrected dyeing recipe is:

Dyestuff 1:                                    Percent
  $c_1'$ ------------------------------------- 0.694
Dyestuff 2:
  $c_2'$ ------------------------------------- 0.652

*Second correcting step*

(1) From the outset there is no assurance that a single correction will lead to the goal, and accordingly a further set of three dyeings is prepared for which the corrected dyeing recipe is again varied in an unsystematic manner. The dyestuff concentrations in these recipes are listed in the following table:

| Dyeing No. | log $c_1$ ($c_1$ in percent) | log $c_2$ ($c_2$ in percent) | ΔE (NBS units) |
|---|---|---|---|
| 4 | −0.179 | −0.203 | 1.05 |
| 5 | −0.147 | −0.195 | 0.93 |
| 6 | −0.159 | −0.171 | 0.67 |
| Average | −0.1617 | −0.1897 | 0.883 |

(2) Measurement of dyeing No. 6 gives a value of 0.67 NBS units, a color difference from the pattern which can be considered sufficiently slight for an acceptable match. In an attempt to obtain a still better approximation, a further correction was calculated although this is not absolutely necessary.

(3) The determinants D, $D_1$ and $D_2$ are obtained in an analogous manner as in the first correcting step with the aid of (1), (4) and (5):

$$D = \begin{vmatrix} 1 & -0.179 & -0.203 \\ 1 & -0.147 & -0.195 \\ 1 & -0.159 & -0.171 \end{vmatrix} = 0.000864$$

$$D_1 = \begin{vmatrix} 1 & 1.05 & -0.203 \\ 1 & 0.93 & -0.195 \\ 1 & 0.67 & -0.171 \end{vmatrix} = -0.00080$$

$$D_2 = \begin{vmatrix} 1 & -0.179 & 1.05 \\ 1 & -0.147 & 0.93 \\ 1 & -0.159 & 0.67 \end{vmatrix} = -0.00976$$

The determinant D is again different from zero to a sufficient degree. The components $g_1$ and $g_2$ of the gradient are obtained according to (3):

$$g_1 = -\frac{0.00080}{0.000864} = -0.93$$

and $$g_2 = -\frac{0.00976}{0.000864} = -11.30$$

According to (7)

$$\overline{\Delta E} = 0.883$$

As before $$\log \, ^0c_1 = \overline{\log \, c_1} = -0.1617$$

and $$\log \, ^0c_2 = \overline{\log \, c_2} = -0.1897$$

are chosen. Then with $$\sum_{j=1}^{2} g_j^2 = 128.6$$

the twice corrected logarithmic concentration coordinates are obtained by means of (6), (8) and (9):

$$\log c_1'' = -0.1617 + 0.93 \frac{0.883}{128.6} = -0.1553$$

and $$\log c_2'' = -0.1897 + 11.30 \frac{0.883}{128.6} = -0.1127$$

After the second correction, translation from logarithmic to numerical form gives the equations:

Dyestuff 1:                                    Percent
  $c_1''$ ------------------------------------ 0.70
Dyestuff 2:
  $c_2''$ ------------------------------------ 0.77

The dyeing produced with this recipe shows a color difference relative to the pattern of 0.67 N.B.S. units, as is the case with Dyeing No. 6. By averaging the dyestuff concentrations derived from the first and second approximation steps, a dyeing recipe is obtained which leads to a dyeing whose color difference is less than 0.6 N.B.S. units and thus almost exactly achieves the optimum.

EXAMPLE 2

The pattern is a dyeing of a commercial dyestuff, the homogeneous brown monoazo dyestuff 1-amino-2-hydroxy - 5 - nitrobenzene→1 - hydroxy - 2 - acetylamino-4-methylbenzene, which is applied in the form of its chromium complex at a concentration of 0.2% calculated on the substrate, a wool yarn.

The color of this pattern is to be matched with a combination of three metal-free dyestuffs—a yellow, a red and a blue. The following recipe is taken from a pattern card and it can be expected to yield a color in the vicinity of that of the pattern.

$c_1$=0.08% of the monoazo dyestuff 1-amino-3-(N-phenyl-N - ethyl - aminosulfonyl) - 4 - methylbenzene→1 - (2', 5′ - dichlorophenyl) - 3 - methyl - 5 - pyrazolone - 4′-sulfonic acid (Dyestuff 1)

$c_2 = 0.08\%$ of the monoazo dyestuff 1-amino-3-(N-phenyl-N - ethyl - aminosulfonyl) - 4 - methylbenzene→1 - hydroxy - 7 - amino - naphthalene - 3 - sulfonic acid (Dyestuff 2)

$c_3 = 0.80\%$ of the sodium salt of 1-amino-2-bromo-4-(4′-methyl - phenylamino) - anthraquinone - 2′ - sulfonic acid (Dyestuff 3).

These three dyestuffs are commercial products.

*First approximation step*

(1) A complete two-level factorial design with eight points was chosen. The design matrix selected comprises the first three columns of the numerical scheme (17). The logarithms of the concentrations were again chosen as independent variables as in the first example. The differences in the logarithmic concentration levels were the same for all three dyestuffs:

$$d_1 = d_2 = d_3 = 0.02$$

and are equivalent to a variation of 5% in each of the dyestuff concentrations. The experimental design established with the aid of Equation 14 is set forth in the following table:

| Dyeing No. | 1.097+log $c_1$ ($c_1$ in percent) | 1.097+log $c_2$ ($c_2$ in percent) | 1.097+log $c_3$ ($c_3$ in percent) | ΔE (N.B.S. Units) |
|---|---|---|---|---|
| 1 | 0 | 0.02 | 0 | 2.41 |
| 2 | 0.02 | 0.02 | 0 | 2.14 |
| 3 | 0.02 | 0 | 0 | 2.37 |
| 4 | 0 | 0 | 0 | 2.50 |
| 5 | 0 | 0.02 | 0.02 | 2.97 |
| 6 | 0.02 | 0.02 | 0.02 | 2.71 |
| 7 | 0.02 | 0 | 0.02 | 3.02 |
| 8 | 0 | 0 | 0.02 | 3.13 |
| Average | | | | 2.65 |

Dyeing No. 4 thus corresponds exactly to the estimated recipe.

(2) The color differences of the eight dyeings in relation to the pattern are measured as described above. The measured results are contained in the above table in the last right-hand column.

(3) None of these color differences is sufficiently small to ensure a technically acceptable match. A better approximation must therefore be calculated from the available measured results. For this purpose the components of the gradient are calculated by means of Equation 15:

$$g_1 = \frac{1}{4 \cdot 0.02}(-2.41+2.14+2.37-2.50-2.97+2.71+3.02-3.13) = -9.6$$

$$g_2 = \frac{1}{4 \cdot 0.02}(-2.41+2.14-2.37-2.50+2.97+2.71-3.02-3.13) = -9.9$$

$$g_3 = \frac{1}{4 \cdot 0.02}(-2.41-2.14-2.37-2.50+2.97+2.71+3.02-3.13) = -30.1$$

With $\overline{\Delta E} = 2.65$ according to (7) and with $$\sum_{j=1}^{3} g_j^2 = 1098$$

the logarithmic concentration coordinates are calculated by means of the extrapolation formula (6) and with (8):

$$\Delta \log c_1 = +0.023$$

$$\Delta \log c_2 = +0.024$$

$$\Delta \log c_3 = -0.073$$

These corrections are inserted into all eight points of the above experimental design according to (9).

*Second approximation step*

(1) The previous calculation yields the new experimental design which is:

| Dyeing No. | 1.074+log $c_1$ ($c_1$ in percent) | 1.073+log $c_2$ ($c_2$ in percent) | 1.170+log $c_3$ ($c_3$ in percent) | ΔE NBS-Units |
|---|---|---|---|---|
| 1 | 0 | 0.02 | 0 | 0.52 |
| 2 | 0.02 | 0.02 | 0 | 0.58 |
| 3 | 0.02 | 0 | 0 | 0.39 |
| 4 | 0 | 0 | 0 | 0.38 |
| 5 | 0 | 0.02 | 0.02 | 0.46 |
| 6 | 0.02 | 0.02 | 0.02 | 0.17 |
| 7 | 0.02 | 0 | 0.02 | 0.37 |
| 8 | 0 | 0 | 0.02 | 0.47 |
| Average | | | | 0.42 |

(2) The color differences measured for the eight corrected dyeings are listed in the final right-hand column of the above table. They are almost all sufficiently small. In particular the color difference for dyeing No. 6 at 0.17 N.B.S. units is so slight that the color of this match can be regarded as identical with that of the distinctly metameric pattern. These findings, derived by way of instrumental evaluation, are in agreement with the results of visual examination in the light of a xenon high pressure lamp.

EXAMPLE 3

The color to be matched is defined by a tolerance solid in color space instead of a pattern. A thermosetting mixture of an unsaturated polyester resin and styrene is to be pigmented and molded in the form of plates reinforced with glass fibers, and the color of the plates must have its locus within the interior of the tolerance solid. To obtain the necessary hiding power and to meet certain conditions of technical application, a certain amount of titanium dioxide and a minimal amount of synthetic umber were incorporated in the mass. With the aid of a color atlas composed of patterns with the relevant colorimetric data and a series of samples previously used for application purposes, the following approximate recipe was set up:

Constant:
  0.25% titanium dioxide (rutile) (100%).
  0.07% synthetic umber (50% paste).

Variable:
  $C_1$: 0.57% monoazo dyestuff 4-chloro-2-nitroaniline →o-chloro-acetoacetanilide (33% paste).
  $C_2$: 1.3% iron oxide red (36% paste).
  $C_3$: 0.23% β-copper phthalocyanine (18% paste).

(1) As only three of the pigments are variable in concentration and the preparation of multiple samples of this material is tiresome and time-consuming, only four pigmentations, the minimum number necessary, were produced. A fractional replication of a factorial design with two concentration levels was chosen, and for its construction the design matrix (13) was employed. The independent variables were again the logarithms of the concentrations. The differences between the two levels of the logarithmic concentration coordinates were the same in all three cases:

$$d_1 = d_2 = d_3 = 0.2$$

This amounts to a variation in each of the concentrations of 58.5%. The experimental design set up with the aid of Equation 14 is thus as follows:

| Dyeing No. | 0.357+log $c_1$ ($c_1$ in percent) | 0.018+log $c_2$ ($c_2$ in percent) | 0.745+log $c_3$ ($c_3$ in percent) | ΔE NBS-Units |
|---|---|---|---|---|
| 1 | 0.2 | 0.2 | 0.2 | 4.49 |
| 2 | 0.2 | 0 | 0 | 3.84 |
| 3 | 0 | 0.2 | 0 | 7.40 |
| 4 | 0 | 0 | 0.2 | 2.62 |
| Average | 0.1 | 0.1 | 0.1 | 4.59 |

(2) The four pigmentations were measured as described in the preceding examples. The color differences relative to the center of gravity of the tolerance solid are listed in the outside right-hand column of the above table. None of the measured color differences is sufficiently small to indicate that a technically acceptable match will be obtained with the pertinent recipe. Accordingly a better approximation is calculated starting from the first set of measurements. Initially, the components of the gradient are calculated by means of (15):

$$g_1 = \frac{1}{20.2}(4.49 + 3.84 - 7.40 - 2.62) = -4.2$$

$$g_2 = \frac{1}{20.2}(4.49 - 3.84 + 7.40 - 2.62) = 13.6$$

$$g_3 = \frac{1}{20.2}(4.49 - 3.84 - 7.40 + 2.62) = -10.3$$

According to (7) $\overline{\Delta E} = 4.59$. From this value and with $$\sum_{j=1}^{3} g_j^2 = 308.7$$

and with the relation (8) the corrected logarithmic concentration coordinates are calculated with the aid of (6) and (9):

$$\log c_1' = -0.257 + 4.2 \cdot \frac{4.59}{308.7} = -0.194$$

$$\log c_2' = -0.082 - 13.6 \cdot \frac{4.59}{308.7} = -0.125$$

$$\log c_3' = -0.645 + 10.3 \cdot \frac{4.59}{308.7} = -0.491$$

The magnitudes $^0c_j$ in (9) are equal to the average values of the logarithmic concentration coordinates as given in the above table.

The corrected pigmenting recipe is thus:

Constant:
 0.25% titanium dioxide (rutile) (100%).
 0.07% synthetic umber (50% paste).

Variable:
 0.64% monoazo dyestuff 4-chloro-2-nitroaniline→o-chloro-acetoacetanilide (33% paste).
 0.75% iron oxide red (36% paste).
 0.32% β-copper phthalocyanine (18% paste).

On pigmentation according to this recipe the material exhibits a color whose locus is situated inside the tolerance solid and 0.85 NBS units distant from its center of gravity. The color match thus achieved is sufficiently close for acceptance and the approximation process can be terminated after this first correction.

Having thus disclosed the invention what I claim is:
1. A process for the production of dyeings and pigmentations, hereafter termed colorations, which dyeings and pigmentations in color conform as nearly as possible to the color of a given pattern and which color may be defined by a physical representation which comprises; (a) preparing a number of colorations that roughly match the prescribed color, using for this purpose $n$ colorants, wherein $n$ is a positive integer, the entirety of the said colorations containing at least $n+1$ colorations satisfying the condition that the determinant D is different from zero, where $$\begin{vmatrix} 1 & c_{11} & c_{12} & c_{13} & \cdots & c_{1j} & \cdots & c_{1n} \\ 1 & c_{21} & c_{22} & c_{23} & \cdots & c_{2j} & \cdots & c_{2n} \\ 1 & c_{31} & c_{32} & c_{33} & \cdots & c_{3j} & \cdots & c_{3n} \\ \cdots & & & & & & & \\ 1 & c_{i1} & c_{i2} & c_{i3} & \cdots & c_{ij} & \cdots & c_{in} \\ \cdots & & & & & & & \\ 1 & c_{n1} & c_{n2} & c_{n3} & \cdots & c_{nj} & \cdots & c_{nn} \\ 1 & c_{n+1,1} & c_{n+1,2} & c_{n+1,3} & \cdots & c_{n+1,j} & \cdots & c_{n+1,n} \end{vmatrix} = D$$

wherein $c_{ij}$ represents the concentration of the $j$th colorant in the $i$th coloration; (b) determining by optical measurement the color differences between the pattern and each of the approximately matching colorations; (c) determining approximately, from the measured color differences, the gradient of the color difference in the concentration space at the center of gravity of the concentration range under examination; (d) determining $n'$ new colorant concentrations by means of the formula $$c_j' = {}^0c_j - f(\overline{\Delta E}) \cdot g_j \cdot \frac{\overline{\Delta E}}{\sum_{i=1}^{n^2} g_i}$$

wherein $c_j'$ represents a new concentration of the $j$th colorant, $^0c_j$ a concentration of the $j$th colorant within the previously explored concentration range, $g_j$ the calculated $j$th component of the gradient of the color difference in the concentration space, $\overline{\Delta E}$ the average color difference of the measured colorations, and $f(\Delta E)$ a function of the average color difference which is adapted, on the basis of previous experience, to provide for a maximum rate of convergence of the process for a specific type of matching problem, the colorant concentrations thus calculated serving as the basis of a further approximate recipe; and (E) repeating this procedure until a coloration is obtained whose color conforms sufficiently closely to that of the pattern.

2. A process according to claim 1, in which the concentrations of the colorants used for the set of colorations which must be prepared at each step of approximation are chosen in accordance with a $2^n$-factorial design.

3. A process according to claim 1 in which a part of the colorations numbering at least $n+1$ satisfying the concentration condition set forth are so determined.

References Cited

Davidson et al., American Dyestuff Rep., Sept. 18, 1950, pages 628–629.

Davidson, American Dyestuff Reporter, Jan. 4, 1952, pages 1–9.

Davies, J., Optical Society of America, vol. 52, No. 6, pages 679–685.

DONALD LEVY, *Primary Examiner.*

NORMAN G. TORCHIN, J. TRAVIS BROWN,
 *Examiners.*

D. LEVY, *Assistant Examiner.*